United States Patent [19]

Boies et al.

[11] Patent Number: 6,006,200

[45] Date of Patent: Dec. 21, 1999

[54] METHOD OF PROVIDING AN IDENTIFIER FOR TRANSACTIONS

[75] Inventors: Stephen Joy Boies, Mahopac; Susan Lynn Spraragen, Ossining, both of N.Y.

[73] Assignee: International Business Machines Corporation, Armonk, N.Y.

[21] Appl. No.: 09/084,267

[22] Filed: May 22, 1998

[51] Int. Cl.$^6$ .................................................. G06F 17/60
[52] U.S. Cl. ............................................................ 705/26
[58] Field of Search ................................................ 705/26

[56] References Cited

U.S. PATENT DOCUMENTS

| | | | |
|---|---|---|---|
| 5,724,522 | 3/1998 | Kagami et al. | 705/26 |
| 5,812,670 | 9/1998 | Micali | 380/25 |
| 5,815,665 | 9/1998 | Teper et al. | 705/26 |
| 5,890,137 | 3/1999 | Koreeda | 705/26 |

OTHER PUBLICATIONS

Sirbu, Marvin A; "Internet Billing Service Design and Implementation", 1993.

Cox, Benjamin T.H.; "Maintaining privacy in Electronic Transactions", Aug. 1994.

Sirbu, Marvin; J.D. Tygar; NetBill: An Internet Commerce System Optimized for Network Delivered Services, Mar. 1995.

Cox, Benjamin; tygar, J.D.; Sirbu, Marvin; NetBill Security and Transaction Protocol, Jul. 1995.

Schneier, Bruce; Applied Cryptography: protocols, algorithms, and source code:, library of congress No. TX–4–216–579, Oct. 1995.

http:/www.ini.cmu.edu/netbill/pubs.html, Apr. 1997.

PC Magazine; vol. 13; No. 18, p. 87; ISSN: 0888–8507; "Needed: A Fee–Based Internet"; Bill Machrone, Oct. 1994.

Information Week; Client–Server; p. 84; "A Standard For Saftery—Net Providers Strive For Encryption and Authentication", Jan. 1995.

*Primary Examiner*—Allen R. MacDonald
*Assistant Examiner*—Akiba Robinson-Boyce
*Attorney, Agent, or Firm*—Whitham, Curtis & Whitham; Stephen C. Kaufman

[57] ABSTRACT

Transactions are conducted on the Internet, by telephone or directly with anonymity and privacy. A customer's shipping address is encoded by a multi-digit identifier which is stored in the database of a trusted third party, preferably the shipping company. A user of the system need only identify themselves to a vendor by this multi-digit identifier which prints the identifier in machine readable form on a package delivered to the shipper.

5 Claims, 4 Drawing Sheets

METHOD OF PROVIDING AN IDENTIFIER FOR TRANSACTIONS

BACKGROUND OF THE INVENTION

1. Field of the Invention

The present invention generally relates to performing transactions with anonymity and, more particularly, to a method for providing a unique identifier for collectively electronically tagging personal data.

2. Background Description

People are hesitant to supply personal data for making transactions for fear of subsequently being placed on direct marketing mailing lists. This is particularly true in conducting transactions over the Internet. If this step of providing name and address were replaced with a more anonymous identifier, perhaps more potential customers would engage in electronic transactions on the Internet. And for those who do, repeated transactions would be easier as they would only have to provide the one field. Such an anonymous identifier could also be used in other types of transactions as well, including telephone transactions and face-to-face transactions in a retail shop.

In order to accomplish this, however, a third party identifier supplier has to be a trusted part of the transaction. Many transactions requiring name and address information involve having a product shipped to a customer. The provider of that service (e.g., U.S. Postal Service, UPS, Federal Express, or other carrier) could well provide a unique personal identifier for the customer. This same identifier could later be used as an additional means for tracking shipments made to the customer. Rather than using a new delivery identifier for each shipment, the customer could provide their personal identifier to track shipment.

SUMMARY OF THE INVENTION

It is therefore an object of the present invention to provide a way to conduct transactions with anonymity and privacy.

According to the invention, there is provided a method for identifying a customer's shipping address by a multi-digit identifier which is stored in the database of a trusted third party, preferably the shipping company. A user of the system need only identify themselves to a vendor by this multi-digit identifier which prints the identifier in machine readable form on a package delivered to the shipper. A further advantage of the invention is that if the customer moves and needs to change their address, they have but one place to do so. Hence, when conducting business with many vendors, one would not need to repeat their address to each vendor for each transaction, rather, all that needs to be provided is an address code.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
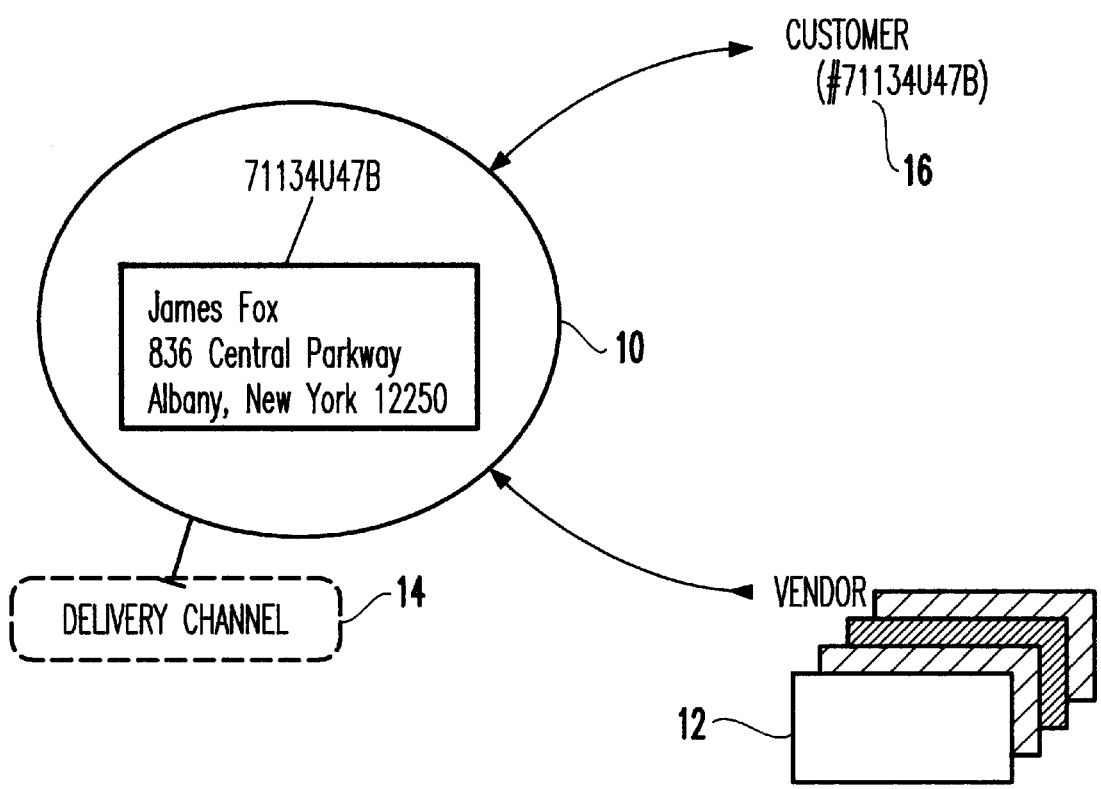
FIG. 1 is a schematic diagram showing the creation and use of a personal identifier throughout the course of a transaction according to the invention.

Referring now to the drawings, and more particularly to FIG. 1, there is shown, in s schematic diagram form, the process of creation and use of a personal identifier for Internet transactions. When ordering a product over the Internet, one must supply to the vendor a shipment address. With this, the vendor can send the product to the customer using some existing delivery mechanism, such as the U.S. Postal Service, UPS, Federal Express, or the like. Also, with this information, the vendor can augment their mailing list and, possibly, sell it to other marketing firms. The purpose of this invention is to conduct the same transactions with anonymity, insuring the privacy of the customer.

The method used in this invention is to employ a third party vendor to supply a unique identifier to the customer that maps to the customer's name and address in a database owned by the third party. The personal identifier is a multi-digit numeric or alphanumeric code assigned to a customer, as indicated at 10. This code is an accepted field by the vendor 12 that is used for shipping purposes. The shipper 14 is the creator and custodian of the codes. It generates a unique code for each customer, which code is associated with the customer's full shipping address and, optionally, the customer's name, permitting shipment to be made to the customer 16.

The association is maintained as a private database by the delivery organization. The shipper has an agreement with the customer not to sell its database codes and addresses to outside marketing organizations. The shipper also has an agreement with vendors to use this code with all shipping requests. When the vendor sends a package to the shipper, it is sent with this code for processing.

Figure 2A:
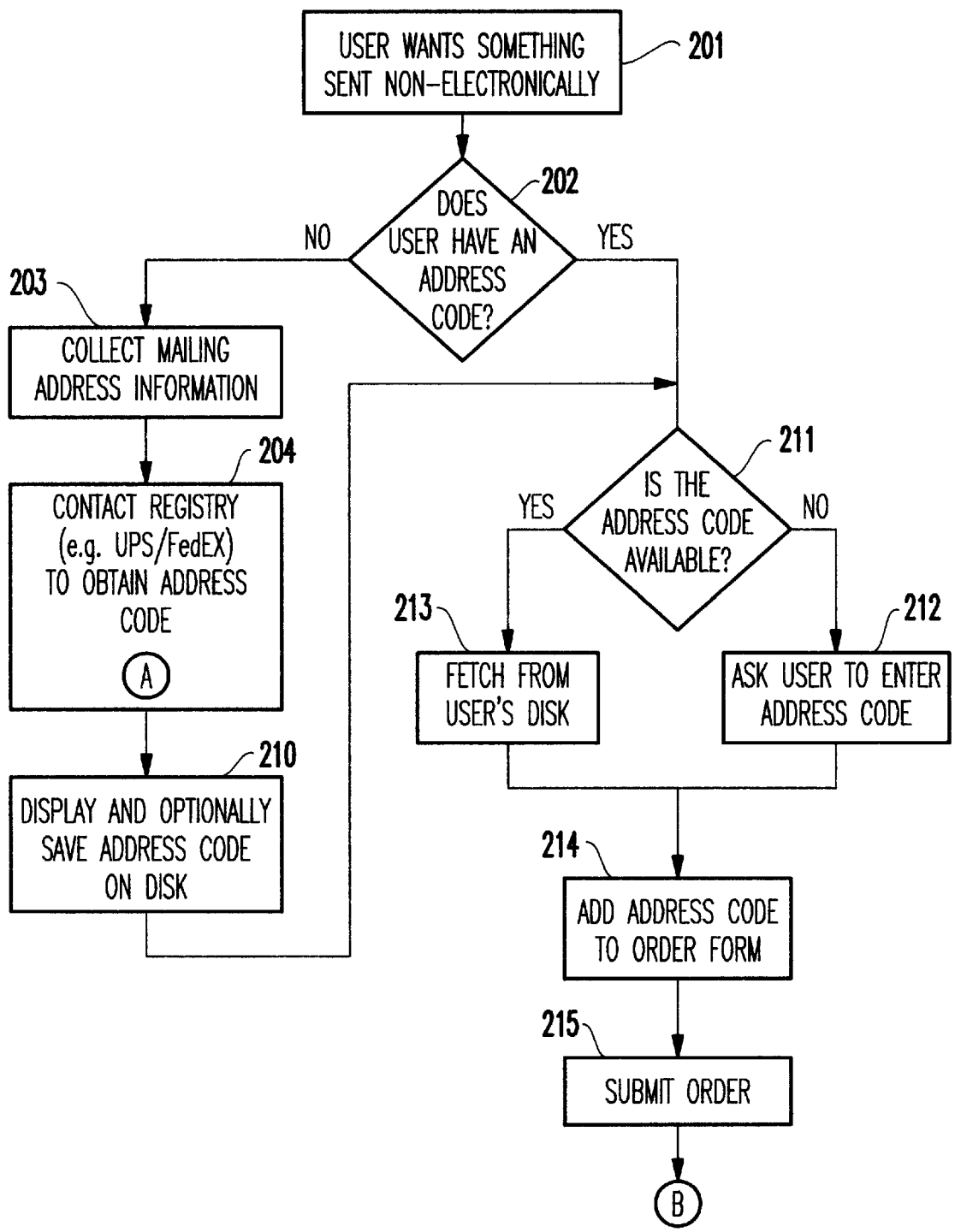
FIGS. 2A, 2B and 2C, taken together, are a flow chart showing the logic of the system implementing the invention.
Figure 2B:
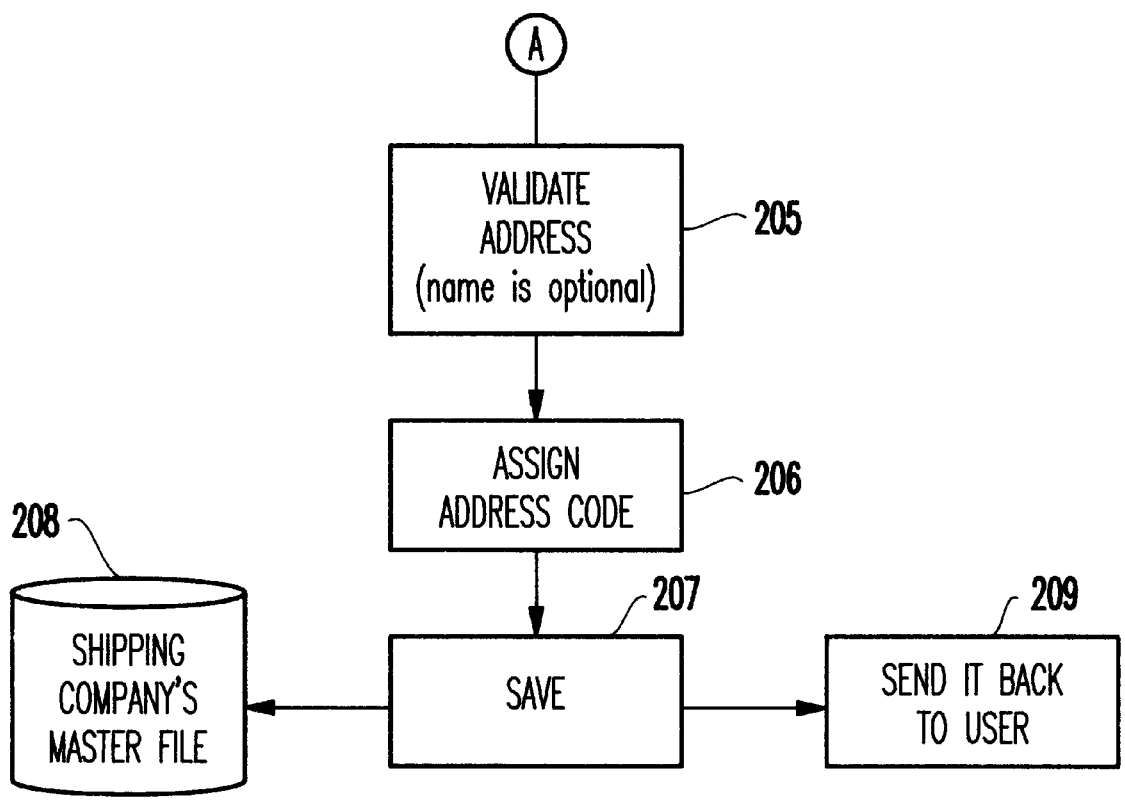
Figure 2C:
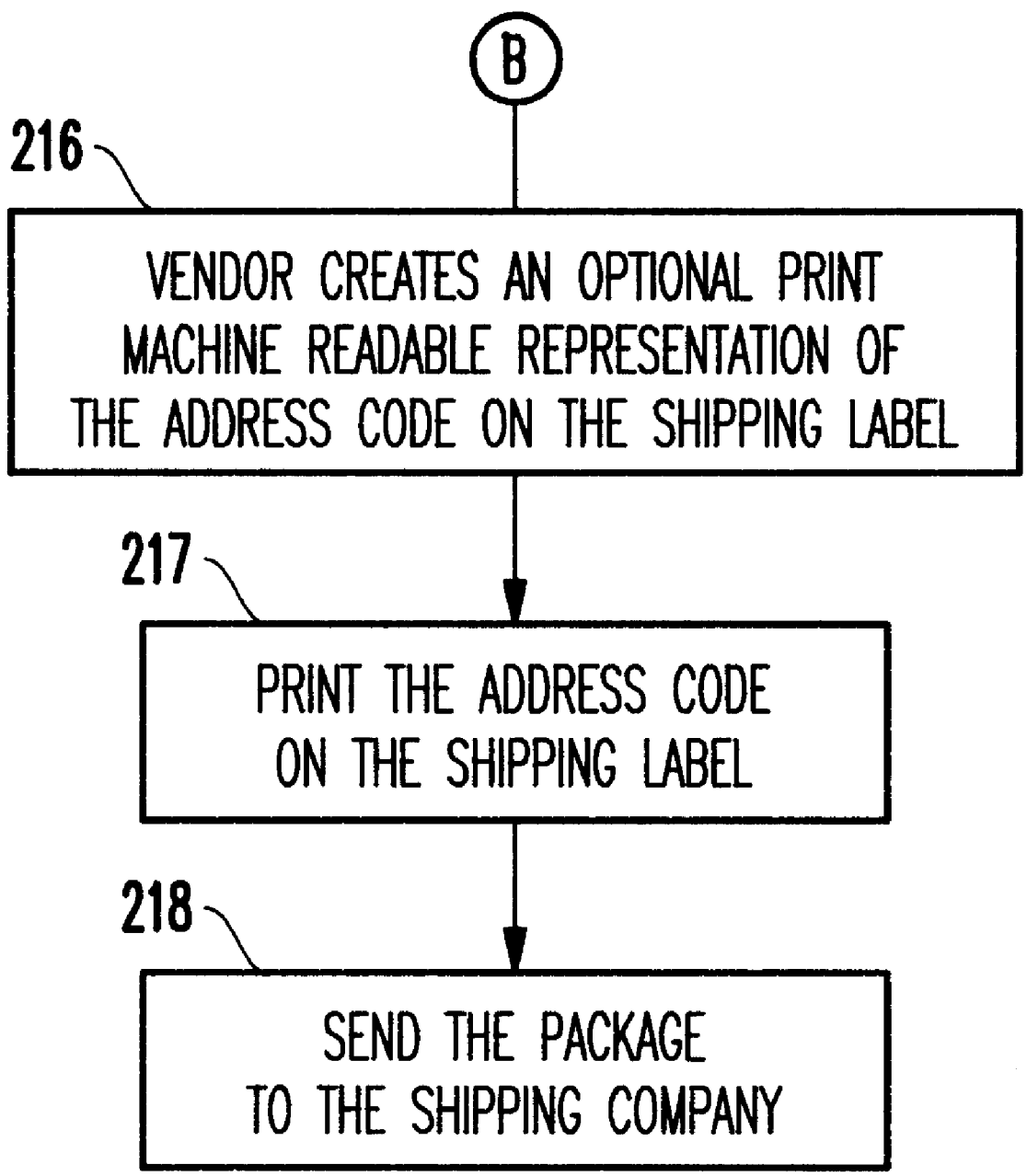

The process is illustrated in more detail in FIGS. 2A, 2B and 2C, to which reference is now made. A transaction begins at block 201 with the user wanting a product that cannot be sent electronically, i.e., over the Internet. An initial determination is made in decision block 202 as to whether the user has an address code. If not, the mailing address information is collected from the user in function block 203. Next, in function block 204, the registry is contacted to obtain an address code. This routine is shown in more detail in FIG. 2B and begins with validating the address in function block 205. An address code is assigned in function block 206, and this code is saved in function block 207 to the shipping company's master file database 208 before a return is made in function block 209 to the main routine in FIG. 2A where the code is displayed and saved to the user's computer in function block 210.

Referring again to FIG. 2A, once the user has an address code then a determination is made in decision block 211 as to whether the address code is available. If not, the user is prompted to enter the address code in function block 212; otherwise, the code is directly retrieved from the user's hard disk in function block 213. The address code is added to the order form in function block 214, and the order is submitted in function block 215.

Referring now to FIG. 2C, when the vendor receives the order, the vendor optionally creates a printed, machine readable representation of the address code on the shipping label in function block 216. The address code is printed to on the shipping label in function block 217, and the package is sent to the shipping company in function block 218. The shipping company uses the machine readable address code printed on the shipping label to access the master file 208 (FIG. 2B) to retrieve the user' shipping address for delivery of the package.

The benefits to the vendor is that more customers will be more likely to participate in their electronic marketplace if they only need to provide their multi-digit identifier instead of their name and address. Thus, the vendor does not know their customer's identity, only their preference for one of their products. The benefit for the delivery agent is that the vendors will be more inclined to choose them for delivering packages. The benefit for the customer is that a level of anonymity is established for the transaction.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of conducting transactions while preserving the anonymity and privacy of a user comprising the steps of:

assigning to a user a multi-digit identifier which is stored in a master file database of a trusted third party;

using by a customer the multi-digit identifier to order a product;

printing by a vendor the multi-digit identifier on a package to be delivered to the customer; and accessing the master file database by a shipper to obtain the customer's shipping address.

2. The method recited in claim 1 wherein the master file database is owned by the shipper.

3. The method recited in claim 1 wherein the multi-digit identifier is printed in machine readable form.

4. The method recited in claim 1 wherein the product is ordered on the Internet.

5. The method recited in claim 1 further comprising notifying by a customer a change of address to the trusted third party in order to effect a change of address.

* * * * *